United States Patent [19]

Ohshima

[11] Patent Number: 5,165,507
[45] Date of Patent: Nov. 24, 1992

[54] DAMPER FOR A FLAPDOOR USING VISCOUS FLUID

[75] Inventor: Kazuyoshi Ohshima, Tokyo, Japan

[73] Assignee: Sugatsune Industrial Co., Ltd., Tokyo, Japan

[21] Appl. No.: 516,928

[22] Filed: Apr. 30, 1990

[30] Foreign Application Priority Data

May 2, 1989 [JP] Japan ................... 1-113283

[51] Int. Cl.[5] ........................... F16D 57/00
[52] U.S. Cl. .................................. 188/290; 16/52; 16/82; 188/82.1; 188/82.6; 188/322.5; 188/291; 192/41 S; 192/81 C; 192/12 A; 267/195; 267/221; 267/155; 4/236
[58] Field of Search ............ 188/290, 291, 322.5, 188/378, 268, 296, 39; 267/136, 221, 217, 195, 226, 154, 155, 156, 157, 286; 192/81 C, 41 S, 58 B, 12 BA, 12 A, 12 B; 16/49-54, 82, 85, DIG. 9-DIG. 10, 72-76, 307, 308, 337; 74/574

[56] References Cited

U.S. PATENT DOCUMENTS

| | | | |
|---|---|---|---|
| 3,542,160 | 11/1970 | Sacchini | 192/41 S X |
| 3,837,441 | 9/1974 | Uno et al. | 188/82.6 |
| 3,860,993 | 1/1975 | Matuska | 16/52 |
| 4,550,470 | 11/1985 | Omata | 188/290 X |
| 4,574,423 | 3/1986 | Ito et al. | 188/291 X |
| 4,576,252 | 3/1986 | Omata | 188/290 X |
| 4,618,039 | 10/1986 | Omata | 16/82 X |
| 4,697,673 | 10/1987 | Omata | 188/290 X |
| 4,780,916 | 11/1988 | Lin | 4/236 |
| 4,830,151 | 5/1989 | Numata | 188/290 |
| 4,893,522 | 1/1990 | Arakawa | 188/290 X |
| 4,938,322 | 7/1990 | Sugasawara et al. | 188/290 |

*Primary Examiner*—Douglas C. Butler
*Attorney, Agent, or Firm*—Jacobson, Price, Holman & Stern

[57] ABSTRACT

According to the invention, there is provided a damper for a flapdoor that does not show any damping effect when its movable shaft of the damper is rotated with the door in one sense whereas it effectively damps the rotary movement of the flapdoor when the movable shaft is rotated with the door in the other sense, wherein a one-way clutch for engaging or disengaging the movable shaft with a movable member depending on the sense of rotation of the movable shaft to cause a viscous shearing drag in the viscous fluid contained in the damper and a power source constitute so many integral parts of a coil spring. A damper for a flapdoor having such an arrangement can have a simplified configuration as compared with a damper provided with a separate coil spring as power source and a separate one-way clutch and therefore can be realized with reduced dimensions. Moreover, since such a one-way clutch can be prepared from a coil spring without requiring any additional processes and by simply engaging a portion of the coil spring with the movable member, the rest of the coil spring functioning as power source, the damper can be realized at a significantly reduced cost.

1 Claim, 4 Drawing Sheets

DAMPER FOR A FLAPDOOR USING VISCOUS FLUID

BACKGROUND OF THE INVENTION

1. Applicable Field of the Invention

This invention relates to a damper for a flapdoor using viscous fluid that comprises a high molecular viscous fluid such as polyisobutylene and a coil spring, wherein the resistance of the damper is obtained as a combined effect of the viscous shearing drag of the fluid and the righting force of the wound or unwound coil spring, said resistance being utilized as damping force to damp the torque load applied to the door when it is swung in one way, said door being lightly and easily swung in the other way due to the righting force of the coil spring and more particularly the present invention relates to a configuration of a coil spring to be used for such a damper both as a one-way clutch and as a power source.

2. Prior Art

FIGS. 6(a) and (b) of the accompanying drawings illustrative a conventional damper using viscous fluid, which comprises within a case a an externally rotatable shaft b, a given number of movable discs c, c', c" ... perpendicularly and rigidly fitted to said rotary shaft b so that they are rotatable with said shaft b, another given number of fixed discs d, d', d" ... arranged alternately with said rotatable discs c, c', c" ... so that they are not rotatable with the rotary shaft b but longitudinally movable due to their engagement with the case a and a certain volume of viscous fluid e filling the space within the case a. An alternative conventional damper (not shown) may comprises movable discs which are not rigidly fitted to the shaft but longitudinally movable.

Either of the above described conventional damper can provide a damping effect against any external force that may be applied to the rotary shaft in the form of rotary force as a viscous shearing drag is generated between each of the movable discs c. c', c" ... and adjacent one of the fixed discs d, d', d" ... within the damper when the movable discs c, c', c" ... that rotate with said rotary shaft are moved relative to the fixed discs d, d', d" ...

3. Problem to be Solved by the Invention

With an arrangement as described above, however, there cannot be provided a variable resistance damper that produces different resistive forces, or damping forces, depending on the since of rotation (clockwise, counterclockwise) of the rotary shaft because it has a constant viscous shearing drag that between each of the movable discs c, c', c" ... and the adjacent one of the fixed discs d, d', d" ... that determines the resistant force of the damper.

Thus, when a damper having a configuration as described above is used for a flap-cover of a toilet stool or a flapdoor of a closet for example, where the rotary shaft of the damper is secured to the cover or the door whose axial torque shows a cosine load curve, its resistance will be significant if the cover or the door is rotated from a 0° position to a 90° position for opening (or closing). Therefore, a very complicated damping mechanism will be necessary if a door is required to be lightly opened and slowly and gradually closed.

In order to solve this problem, there has been proposed by the inventor of the present invention a damper for a flapdoor using viscous fluid comprising within a case a rotary shaft rotatable with the flapdoor, a movable members fitted to said shaft by way of a one-way clutch so that it can be rotated with the rotary shaft only in one sense, a coil spring arranged within said case in a state where it is wound to some extend under stress and viscous fluid filling the space within the case, the viscous shearing drag of the viscous fluid and the righting force of the wound coil spring being utilized for damping the movement of the rotary shaft.

While a flapdoor damper having a configuration as described above does not show any damping effect when the flapdoor is rotated from a 0° position to a 90° position, it effectively damps the rotary movement of the flapdoor when the door is rotated back from the 90° position to the initial 0° position, so that the door can be operated with a light, slow and smooth motion that can be controlled by way of the single rotary shaft.

The object of the present invention is to provide a flapdoor damper using viscous fluid at a reduced cost by incorporating a single coil spring that has a combined effect of the one-way clutch and the spring of the above described damper that functions as a power source so that it may be realized with reduced dimensions and a simplified configuration, while maintaining the performance of its predecessor model.

SUMMARY OF THE INVENTION

Means to Solve the Problem

According to the invention, the above object is achieved by providing a flapdoor damper using viscous fluid comprising within a case a movable shaft to be rotatably secured to a flapdoor, a movable member fitted to said movable shaft by way of a one-way clutch so that it may be rotatable only in one sense with the movable shaft, a coil spring arranged within said case with its one end rigidly fitted to said case and viscous fluid filling the space within said case, the combined effect of the viscous shearing drag of the viscous fluid and the righting force of the coil spring being utilized as resistance against the movement of said movable shaft, a portion of said coil spring being press fitted into said movable member and said movable shaft by said movable member, said one-way clutch being formed by said press fitted portion and a power source section being formed by the area of the coil spring other than said press fitted portion.

A preferred embodiment of the present invention comprises within a case a movable shaft to be rotatably secured to a flapdoor, a cylindrical movable member fitted to said movable shaft by way of a one-way clutch so that it may be rotatable only in one sense with the movable shaft, a coil spring arranged within said case with its one end rigidly fitted to said case and its other end also rigidly fitted to said movable shaft and viscous fluid filling the space within said case, the combined effect of the viscous shearing drag of the viscous fluid and the righting force of the coil spring being utilized as resistance against the movement of said movable shaft, a portion of said coil spring being press fitted into a portion of said cylindrical movable member having a reducing inner diameter, said one-way clutch being formed by said press fitted portion and a power source section being formed by the area of the coil spring other than said press fitted portion.

Another preferred embodiment of the present invention comprises within a case a movable shaft to be rotatably secured to a flapdoor, a cylindrical movable member fitted to said movable shaft by way of a one-way clutch so that it may be rotatable only in one sense with the movable shaft, a coil spring arranged within said case with its one end rigidly fitted to said case and its other end also rigidly fitted to said movable shaft and viscous fluid filling the space within said case, the combined effect of the viscous shearing drag of the viscous fluid and the righting force of the coil spring being utilized as resistance against the movement of said movable shaft, a portion of said coil spring being press fitted into a portion of said cylindrical movable member having a enlarged outer diameter, said one-way clutch being formed by said press fitted portion and a power source section being formed by the area of the coil spring other than said press fitted portion.

Still another preferred embodiment of the present invention comprises within a case a movable shaft to be rotatably secured to a flapdoor, a cylindrical movable member fitted to said movable shaft by way of a one-way clutch so that it may rotatable only in one sense with the movable shaft, a coil spring arranged within said case with its one end rigidly fitted to said case, its other end being free, and viscous fluid filling the space within said case, the combined effect of the viscous shearing drag of the viscous fluid and the righting force of the coil spring being utilized as resistance against the movement of said movable shaft, said free end of said coil spring being press fitted into a cylindrical portion of said cylindrical movable member, another portion of said coil spring being press fitted to the outer periphery of a portion of the movable shaft adjacent to said cylindrical portion having an enlarged diameter which is equal to that of said cylindrical portion of the movable member, said one-way clutch being formed by said press fitted portions and a power source section being formed by the area of the coil spring other than said press fitted portions.

Operation

When an external force is applied in one direction to rotate the movable shaft of a flapdoor damper according to the invention, the diameter of the coil spring is modified by the rotation of said movable shaft to release the engagement of the one-way clutch and the movable member so that only the movable shaft may be rotated further without generating any viscous shearing drag of the viscous fluid.

Therefore, if the flapdoor is closed at a 0° position and fully open at a 90° position, the coil spring is either wound or unwound as the door is rotated to its closed position so that the righting force of the coil spring is applied to the movable shaft.

On the other hand, as the diameter of the coil spring is modified, it comes to engage the movable member and acts as a one-way clutch. Therefore, the movable member which is linked with the movable shaft is rotated with the latter and consequently a viscous shearing drag of the viscous fluid will be generated.

Thus, the door will be closed smoothly and lightly due to the righting force of the coil spring and the viscous shearing drag at a rather constant speed and the righting force of the coil spring stored during the closing movement of the door ensures a smooth door opening operation.

Now the present invention will be described in greater detail by referring to the accompanying drawings that illustrate preferred embodiments of the invention.

DETAILED DESCRIPTION OF THE INVENTION

Figure 1:
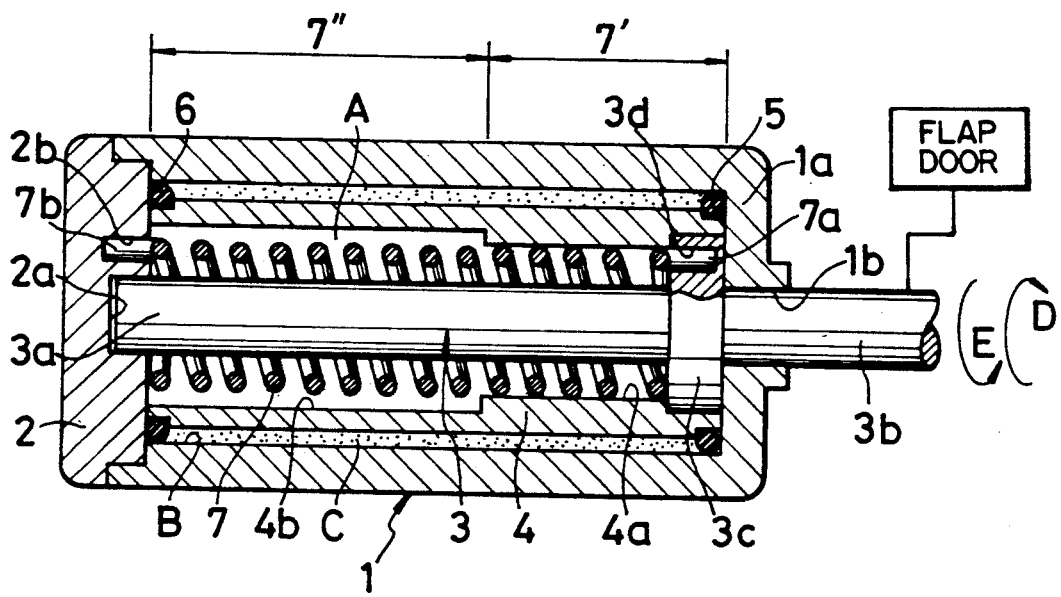
FIG. 1 is a longitudinal sectional view of a first preferred embodiment of the present invention.

Referring to FIG. 1 that illustrates a first preferred embodiment of the invention, the cylindrical case 1 has a shaft bore 1b at the center of a circular end wall 1a located at an end thereof. A lid plate 2 is airtightly fitted into the opposite end of the cylinder which is open without the lid.

Movable shaft 3 is airtightly and rotatably fitted into the shaft bore 1b of the cylindrical case 1 at one end and its other end 3a is received by a shaft bearing recess 2a formed at the center of the lid plate 2 so that the shaft 3 is coaxial with the case 1 and rotatable around the axis of the case.

The end 3b of the movable shaft 3 which is opposite to the end 3a and projecting toward outside from the shaft bore 1b is tightly linked with the rotary shaft of a flapdoor illustrated schematically in FIG. 1 so that moment may be externally applied to the movable shaft.

Within the case 1, the movable shaft 3 is provided with a flange 3c that abuts the inner surface of the end wall 1a so that the movable shaft 3 would not come out of the case 1 any further.

The case 1 contains a cylindrical and rotationally movable member 4 having an axial length equal to or slightly smaller than the effective axial length of the inner space of the case 1 and an outer diameter smaller than the inner diameter of the case 1 by a given distance.

The cylindrical movable member 4 comprises a smaller inner diameter section 4a located closer to the end wall 1a of the case 1 and engaged with the flange 3c of the movable shaft 3 and a larger inner diameter section 4b located closer to the lid plate 2 and both of the inner diameters are significantly greater than the outer diameter of the movable shaft 3 so that the cylindrical movable member 4 is axially rotatable relative to the movable shaft 3 and coaxial with the inner periphery of the case 1.

The space, if any, between the movable member 4 and the inner surface of the end wall 1a and the space, if any, between the movable member 4 and the lid plate 2 are airtightly sealed by appropriate sealing means such as O-rings 5, 6. With such an arrangement, the space within the case 1 is divided into a central chamber A and a peripheral chamber B formed between the case and the movable member 4, the peripheral chamber B being filled with viscous fluid C such as polyisobutylene or other high molecular viscous fluid or highly viscous water glass.

A single coil spring 7 arranged within the central chamber A has not only the role of a one-way clutch that connects or disconnects the linkage between the movable shaft 3 and the movable member 4 depending on the sense of rotation of the movable shaft 3 but also that of a power source.

More specifically, the coil spring 7 is realized by helically winding a steel wire having a circular or square or otherwise polygonal cross section in such a manner all the windings of the coil have an identical outer diameter and has two ends in the form of so many hooks 7a, 7b which are anchored respectively to spring anchoring grooves 3d, 2b, respectively provided on the flange 3c of the movable shaft 3 and a member stationary relative to the movable shaft 3 or the lid plate 2 in FIG. 1 so that the coil spring 7 surrounds the outer periphery of the movable shaft 3 with its several windings contained within the smaller inner diameter section 4a of the movable member 4. With such an arrangement, the windings of the coil spring 7 that are contained within the smaller inner diameter section 4a plays the role of one-way clutch 7' whereas the other windings contained within the larger diameter section 4b of the movable member 4 plays the part of power source 7''.

The coil spring 7 may be arranged within the movable member 4 in a manner as described after it has been forcibly twisted further. In such a case, the movable shaft 3 is furnished only with a rotary force in the sense as indicated by arrow D due to the righting force of the coil spring 7.

When a damper as described above is used with a flapdoor, the movable shaft 3 is tightly linked with the door, while the case 1 is rigidly fitted to a fitting member of the door. If for instance it is desired that the door is swingable by 90° and takes a closed 0° position when it is horizontally lying and an open 90° position when it is vertically standing, the movable shaft 3 of the damper is linked with the door in such a manner that the shaft 3 is rotated in the sense as indicated by arrow D when the door is being opened.

As the door is swung open and the movable shaft 3 is rotated in the sense indicated by arrow D as described above, the diameter of the windings of the coil spring 7 comes to be reduced because of its righting action thereby reducing the outer periphery of the spring windings, consequently releasing the portion of the spring contained within the smaller inner diameter section 4a from engagement with the inner periphery of the smaller inner diameter section 4a of the movable member 4 to bring the one-way clutch into a "disconnected" condition under which the movable member 4 is not rotated with shaft 3. Then, only the movable shaft 3 is rotated in the sense as indicated by arrow D and the movable member 4 is made stationary and therefore does not give rise to any viscous shearing drag in the viscous fluid.

Then the movable shaft 3 is forcibly rotated by said righting force of the coil spring 7 to allow a smooth opening motion of the door.

If, then, the door is moved for closing, the movable shaft 3 is rotated in the sense as indicated in FIG. 1 and the diameter of the windings of the coil spring 7 contained within the smaller inner diameter section 4a is enlarged until the outer periphery of this partion of spring 7 comes to driving engage with the inner periphery of the smaller diameter section 4a of the movable member 4 to bring the one-way clutch into a "connected" state, under which the movable member 4 is rotated with the movable shaft 3 to consequently generate a viscous shearing drag in the viscous fluid.

Since the power source 7'' of the coil spring 7 has a righting force under this condition, the movable shaft 3 is subjected to a combined effect of the viscous shearing drag and the righting force so that it is slowly and smoothly rotated to close the door.

Figure 2:
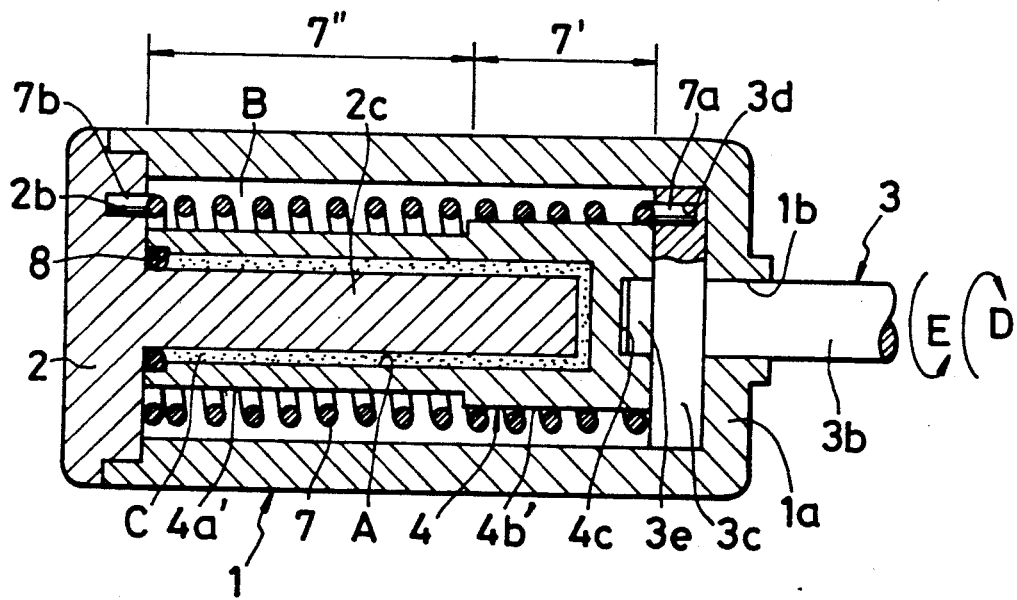
FIG. 2 is a longitudinal sectional view of a second preferred embodiment of the invention.

FIG. 2 of the accompanying drawings illustrates a second preferred embodiment of the invention.

In this embodiment, movable shaft 3 is rotatably supported by a shaft bore 1b of case 1 and the inner extremity 3e of the movable shaft 3 is received by a shaft bearing recess 4c provided at the center of an end wall of movable member 4. A circular column 2c inwardly projecting from the center of the inner surface of lid plate 2 is inserted from the other end of the movable member 4 which is open so that inner space of the case 1 is airtightly closed by the base portion of the outer periphery of the circular column 2c and the inner periphery of the open end portion of the movable member 4. Thus, the movable member 4 is rotationally contained within the case 1 to divide the space within the case 1 into a central chamber A and a peripheral chamber B, of which the central chamber A or the space defined by the outer periphery of said circular column 2c and the inner periphery of the movable member 4 contains viscous fluid C of a type which is described earlier.

The movable member 4 comprises a larger outer diameter section 4b' located adjacent to the movable shaft 3 and a smaller outer diameter section 4a' located away from the movable shaft 3.

The coil spring 7 is has a given inner diameter and a given outer diameter like that of the above described first embodiment has hooks 7a, 7b formed at its opposite ends. It is forcibly arranged around the larger outer diameter section 4b' of the movable member 4 and the hooks 7a, 7b are respectively anchored in the spring holding grooves 3d, 2b respectively formed in flange 3c of the movable shaft 3 and the lid plate 2 so that the portion of the coil spring 7 that forcibly surrounds the larger outer diameter section 4a of the movable member 4 constitutes a one-way clutch 7' while the other portion of the coil spring 7 constitutes a power source 7''.

The coil spring 7 may have been forcibly twisted further before it is arranged within the case so that the movable shaft 3 is subjected to the initial righting force of the coil spring 7.

With such an arrangement, if the movable shaft 3 is rotated in the sense indicated by arrow D as illustrated in FIG. 2, the diameter of the windings of the coil spring 7 comes to be increased because of its righting action, consequently releasing the engagement of the one-way clutch 7' and the outer periphery of the larger outer diameter section 4a of the movable member 4 to bring the one-way clutch into a "disconnected" condition. Then, the movable member 4 is made stationary and therefore does not give rise to any viscous shearing drag in the viscous fluid.

If, then, the door is moved for closing, the movable shaft 3 is rotated in the sense indicated by arrow E in FIG. 1 and the diameter of the windings of the coil 7 is reduced until the one-way clutch 7' comes to engage with the outer periphery of the larger outer diameter section 4a of the movable member 4 to bring the one-way clutch into a "connected" state, under which the movable member 4 is rotated with the movable shaft 3 to consequently generate a viscous shearing drag in the viscous fluid.

Since the power source 7" of the coil spring 7 has a righting force under this condition, the movable shaft 3 is subjected to a combined effect of the viscous shearing drag and the righting force so that it is slowly and smoothly rotated to close the door.

Figure 3:
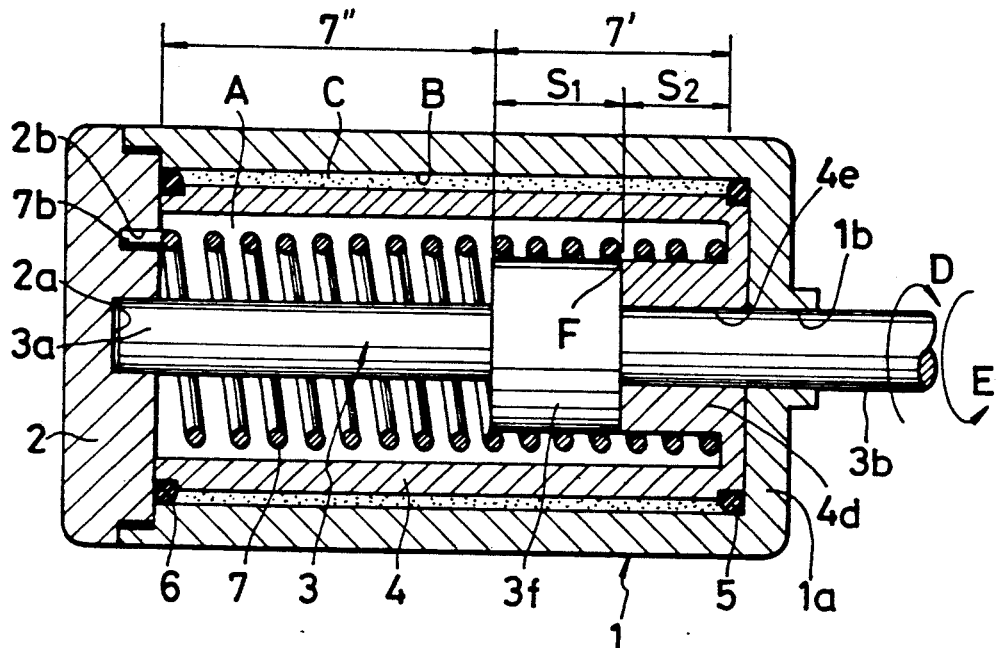
FIG. 3 is a longitudinal sectional view of a third preferred embodiment of the invention.

FIG. 3 of the accompanying drawings illustrates a third preferred embodiment of the invention.

As illustrated, movable shaft 3 is coaxial with the longitudinal axis of case 1 and rotatable therearound as in the case of the first embodiment, although it has a bulged section 3f with a given longitudinal length within the case 1.

The movable member 4 has a cylindrical section 4d integrally formed therewith at an axial end thereof with an outer diameter equal to that of the bulged section 3f of the movable shaft 3, the cylindrical section 4d being provided with an axial through shaft bore 4e through which the movable shaft 3 runs so that the cylindrical section 4d being arranged between the bulged section 3f and end wall 1a of the case 1 and therefore the movable member 4 being rotatably engaged with the movable shaft 3 within the case 1.

The space between the inner periphery of the case 1 and the outer periphery of the movable member 4 is airtightly sealed by a pair of O-rings 5, 6 at the opposite ends of the movable member 4. Consequently, the case contains within it two chambers A and B, of which the chamber B which is defined by the inner periphery of the case and the outer periphery of the movable member 4 is filled with viscous fluid C as in the case of the first embodiment described earlier.

The coil spring 7 has a given inner diameter and a hook 7b is formed at one of its opposite ends and anchored into a groove 2b formed on the lid plate 2, whereas the other end is free. A given number of windings are forcibly fitted around the outer periphery of the bulged section 3f and that of the cylindrical section 4d to form a one-way clutch 7' while the rest of the windings serve as power source 7".

With such an arrangement, when a torque is applied to the movable shaft 3 to open the door attached to it from a 0° position, it is rotated in the sense indicated by arrow D in FIG. 3 to twist portion S1 of the one-way clutch 7' of the coil spring 7 to unwind the coil 7 as the torque is transmitted to the portion S1 at point F on the movable shaft 3. Consequently, portion D2 of the coil spring 7 is radially expanded and becomes slidable on the cylindrical section 4d. As a result, the movable member 4 is not rotated with the movable shaft 3 and therefore not viscous shearing drag is generated within the viscous fluid so that the door may be opened lightly and smoothly.

When conversely the door is moved from a 90° position for closure, the movable shaft 3 is rotated in the sense indicated by arrow E and the one-way clutch 7', or the portions S1 and S2, of the coil spring 7 comes into engagement with the bulged section 3f of the movable shaft 3 and the cylindrical section 4d of the movable member 4 so that the movable member 4 is rotated with the movable shaft 3 to generate viscous shearing drag within the viscous fluid C.

Simultaneously, the power source 7" of the coil spring 7 generates power as it is twisted and the power acts on the movable shaft 3 as righting force to slowly and smoothly close the door.

Figure 4:
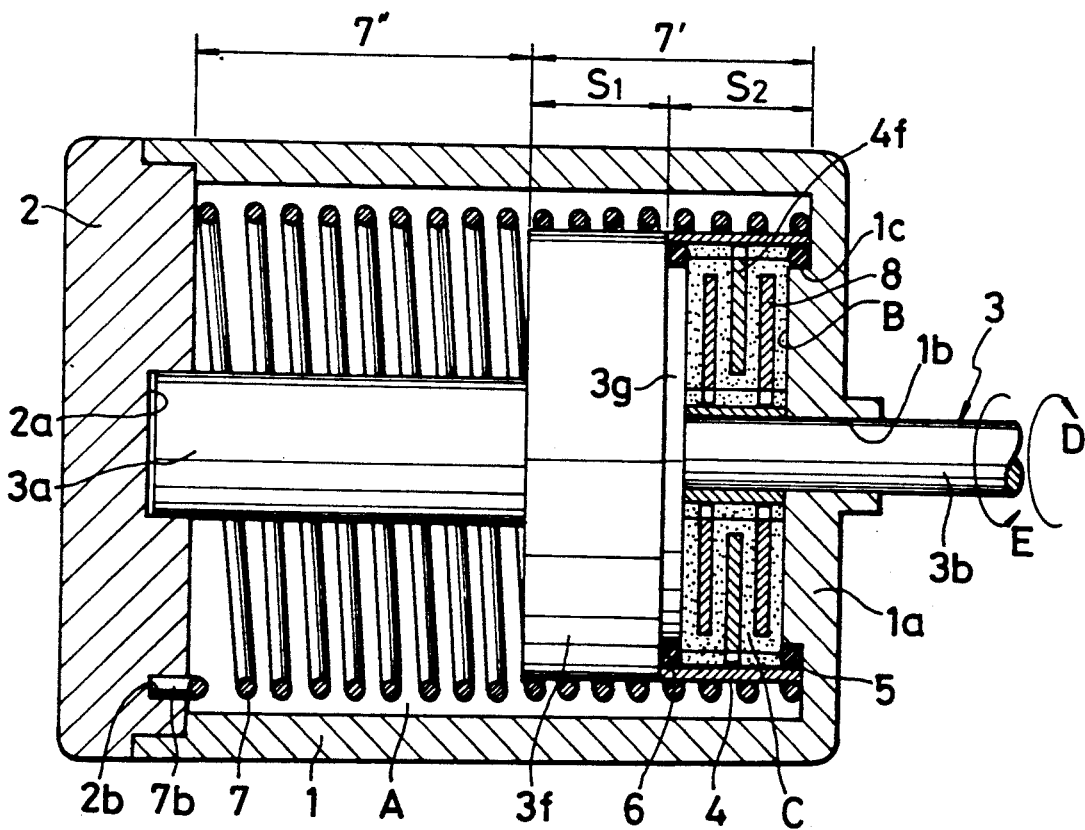
FIG. 4 is a longitudinal sectional view of a fourth preferred embodiment of the invention.

FIG. 4 illustrate a fourth embodiment of the invention provided with a multi-disc damper system.

As illustrated, movable shaft 3 is coaxial with case 1 and rotatable relative thereto. The movable shaft 3 has a bulged section 3d as in the case of the above described third embodiment but having a diameter far greater than that of its counterpart of the third embodiment.

End wall 1a and the bulged section are respectively provided with disc-shaped projections 1c, 3g on their opposite surfaces, the disc-shaped projections 1c, 3g having an identical diameter, O-rings 5, 6 being respectively arranged around the outer peripheries of the dis-shaped projections 1c, 3g to airtightly enclose a space defined by those projections and the inner periphery of movable cylindrical member 4 which is rotatable relative to the case 1. Consequently, the entire space within the case is dividend into two chambers A and B.

The chamber B contains within it a given number of movable discs 4f which are rotatable with the movable member 4 and arranged perpendicular to the periphery of the movable member 4 and another given number of fixed discs 8, 8 arranged alternately with the movable discs 4f in such a manner they are not rotationally movable with the movable member 4 because they are engaged with the case 1 but capable of being axially displaced, any space between each of the movable discs 4f and the adjacent one of the fixed discs 8, 8 within the chamber B of the case being filled with viscous fluid C.

The coil spring 7 has a given inner diameter with its one end provided with a hook 7b which is anchored in a spring holding groove 2b arranged on lid plate 2. Several windings of the coils spring from its other end are engaged with the outer periphery of the bulged section 4 of the movable shaft 3 and that of the movable member 4.

Therefore, the portion of the coil spring 7 that is engaged with the bulged section 3f and the movable member 4 forms a one-way clutch 7', while the rest of the coil spring 7 constitutes a power source.

When the movable shaft 3 is rotated in the sense of arrow D or E as the door is opened or closed, the one-way clutch 7' functions in a manner same as that of the third embodiment described above.

When the movable member 4 of this fourth embodiment is rotated with the movable shaft 3 in the sense indicated by arrow E as the door is moved from a vertical position, or a 90° position, to a horizontal position, or a 0° position, the movable discs 4f are moved with the movable member 4 relative to the fixed discs 8, 8 to generate a viscous shearing drag within the viscous fluid C, which, combined with the righting force of the power source 7" of the coil spring 7, can effectively harness any movement of the movable shaft or the door due to external forces.

Figure 5:
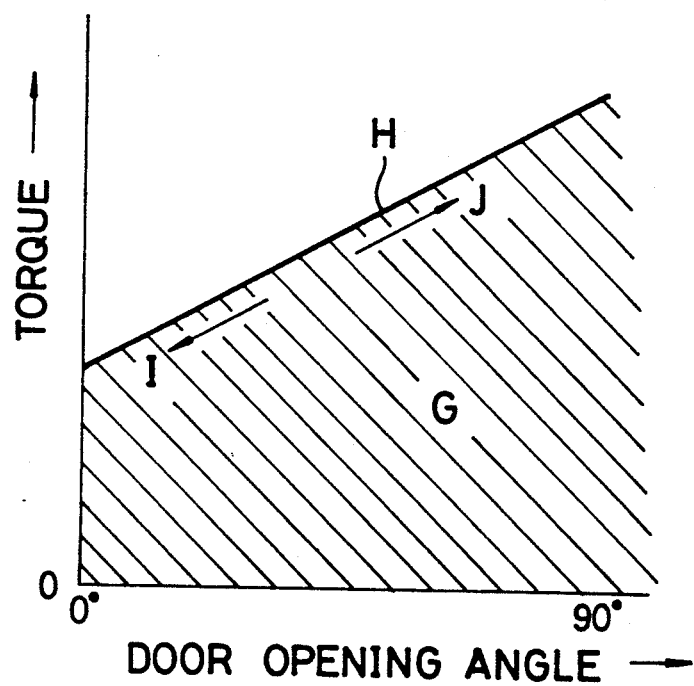
FIG. 5 is a graphic illustration showing the relationship between the torque of a flapdoor equipped with a damper according to the invention and the angle of the door, indicating the effective area of the viscous shearing drag and the righting force of the coil spring it contains.
Figure 6A:
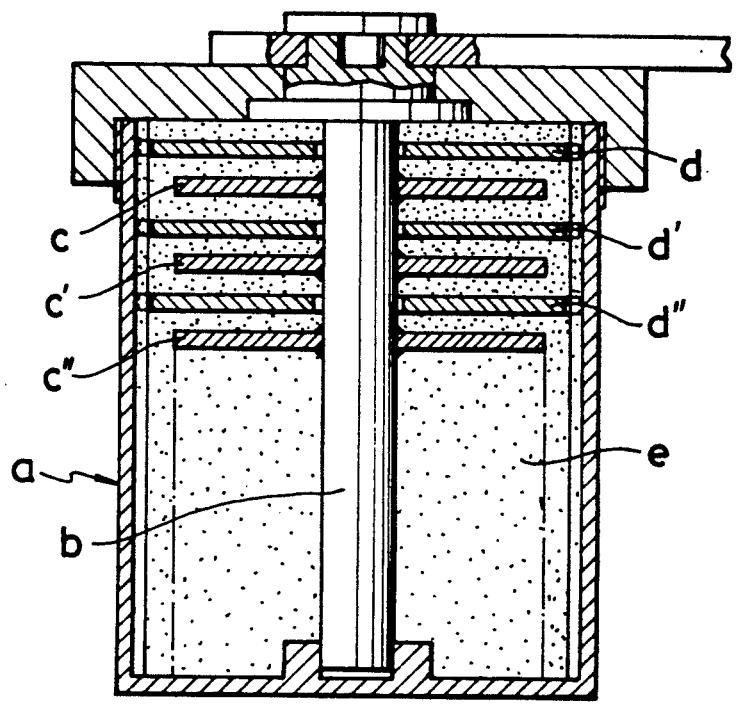
FIG. 6(a) is a longitudinal sectional view of a conventional damper using viscous fluid.
Figure 6B:
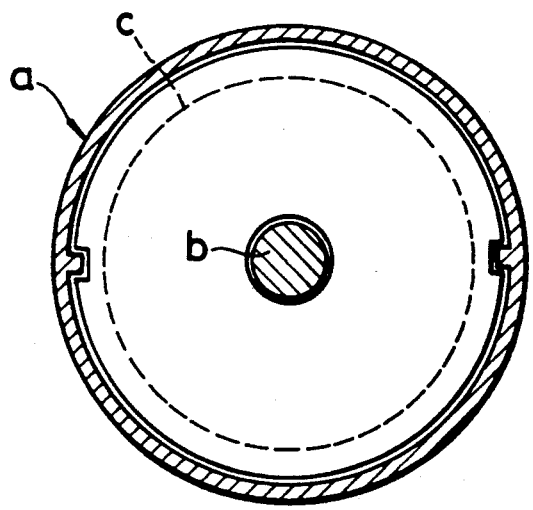
FIG. 6(b) is a transverse sectional view of the damper of FIG. 6(a).

FIG. 5 is a graphic illustration showing the relationship between the torque of a flapdoor equipped with a damper according to the invention and the angle of the door, indicating the effective area of the viscous shearing drag and the righting force of the coil spring it contains, where notation G indicates the effective area of the viscous shearing drag of the damper and notation H indicates the righting force generated by the power source 7" of the coil spring 7.

Arrow I in FIG. 5 indicates the direction of damper ON and arrow J indicates that of damper OFF effected by the coil spring 7.

EFFECTS OF THE INVENTION

As apparent from the above description, according to the present invention there is provided a damper for a flapdoor that does not show any damping effect when its movable shaft of the damper is rotated with the door in one sense whereas it effectively damps the rotary movement of the flapdoor when the movable shaft is rotated with the door in the other sense, wherein a one-way clutch for engaging or disengaging the movable shaft with a movable member depending on the sense of rotation of the movable shaft to cause a viscous shearing drag in the viscous fluid contained in the damper and a power source constitutes so many integral parts of a coil spring. A damper for a flapdoor having such an arrangement can have a simplified configuration as compared with a damper provided with a separate coils spring as power source and a separate one-way clutch and therefore can be realized with reduced dimensions. Moreover, since such a one-way clutch can be prepared from a coil spring without requiring any additional processes and by simply engaging a portion of the coil spring with the movable member, the rest of the coil spring functioning as power source, the damper can be realized at a significantly reduced cost.

What is claimed is:

1. A flapdoor damper using viscous fluid comprising a case, a rotatable shaft secured to a flapdoor, a rotatable member fitted to said rotatable shaft by way of a one-way clutch so that said rotatable member is rotatable only in one sense with the shaft, said one-way clutch including a coil spring arranged within said case with one end rigidly fitted to said case and viscous fluid filling a space within said case, the combined effect of a viscous shearing drag of the viscous fluid and a righting force of the coil spring being utilized as resistance against rotation of said shaft in one rotatable direction to dampen movement of the flapdoor, the other end of said spring including a portion engaged with said rotatable member and a portion engaged with said shaft, said one-way clutch being formed by said portion of said spring engaged with said rotatable member and said portion of the spring engaged with the shaft and a power source section being formed by a portion of the coil spring other than said portion engaged with said rotatable member, said rotatable shaft and rotatable member being disposed in concentrically spaced relation and said case and rotatable member being in concentrically spaced relation with the viscous fluid being positioned in the space between the rotatable member and case, said rotatable member having an internal cylindrical shoulder adjacent one end thereof with the portion of the coil spring engaged with the rotatable member being fitted into engagement with the internal shoulder for driving engagement therewith when the shaft is rotated in one direction and disengaged from the internal shoulder when the shaft is rotated in the opposite direction, the portion of said spring engaged with the shaft including the other end of the spring being connected to the shaft.

* * * * *